Dec. 21, 1954   R. N. STEELE   2,697,296
BAIT CAN
Filed March 12, 1951
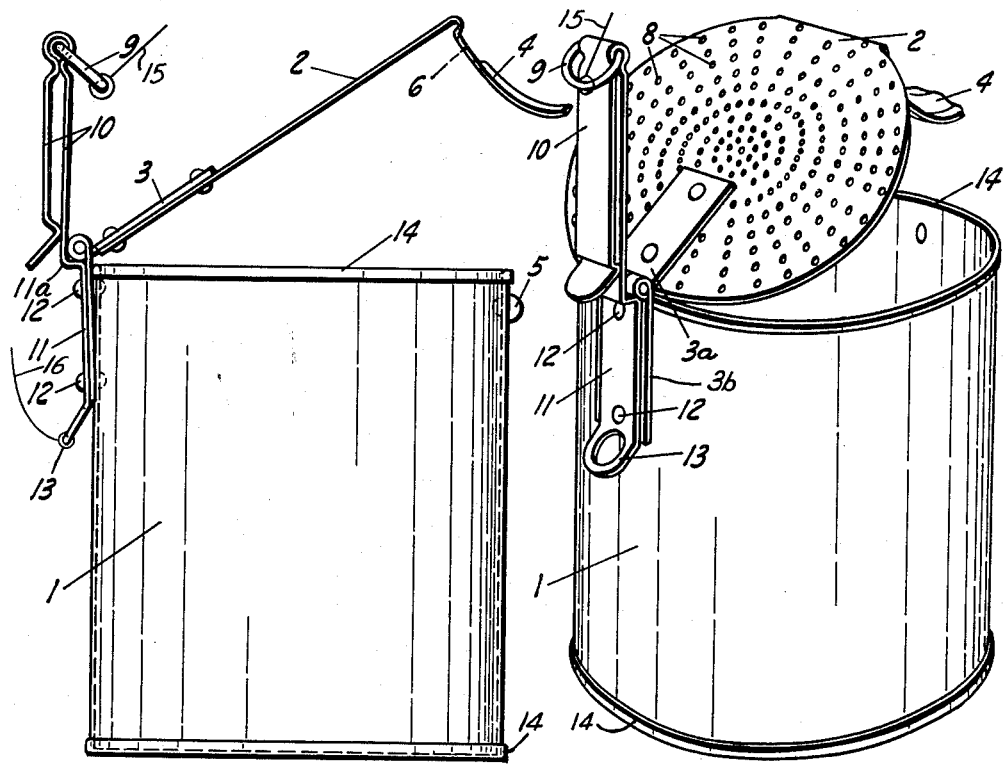
Fig. 2
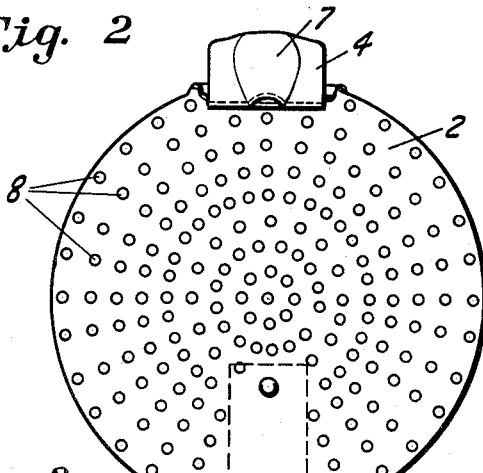
Fig. 3
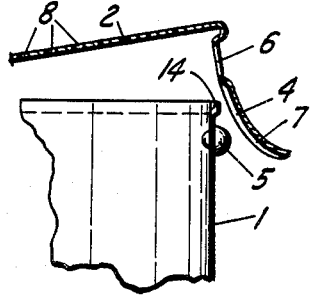
Fig. 1
Fig. 4
INVENTOR.
RAY N. STEELE
BY
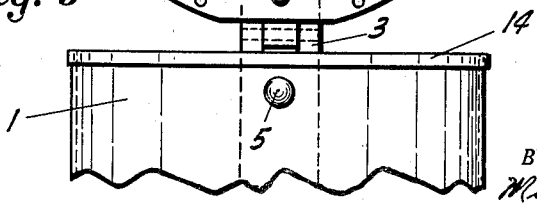
ATTORNEY

United States Patent Office 2,697,296
Patented Dec. 21, 1954

2,697,296
BAIT CAN

Ray N. Steele, Cedar Rapids, Iowa

Application March 12, 1951, Serial No. 215,139

6 Claims. (Cl. 43—55)

The present invention relates to improvements in readily portable bait cans and has reference to improvements tending to make the bait can portable by the fisherman, without carrying a large can wherever he happens to go.

As is well known to fishermen, the ordinary bait can holds about three gallons or, as a maximum, about four gallons, but this is too bulky for the fisherman to carry with him wherever he goes. It is therefore an object of this invention to provide a small enough can so that the fisherman can hook it on his belt and travel wherever he wants to go, without being impeded by a large can.

In the drawings annexed hereto and forming a part hereof,

Fig. 1 represents a perspective view of my bait can;
Fig. 2 represents a side view thereof;
Fig. 3 represents a fragmentary side view at a right angle to the view shown in Fig. 2; and
Fig. 4 is a partial fragmentary section of the latch.

Reference will now be made in greater detail to the annexed drawings for a more complete description of this invention. A can 1 has a lid 2 connected thereto by a hinge 3. The hinge 3 comprises interfitting hinge parts 3a and 3b, as will be understood, one leaf of the hinge part 3b being fixed between the lower attaching section 11 and the container 1. The other leaf section 3a is connected to the cover 2. The joint of the hinge lies above the container 1. The lid 2 has a tab 4 projecting from one side thereof, which tab has a hole therein to receive a button 5 when the lid is closed. This hole is formed in a flat portion 6, and the tab or handle 4 has a groove 7 which engages the button and slides down, holding the tab in proper alignment. The lid or cover 2 has a plurality of openings 8, providing for a fresh supply of air and for drainage of water from the can whenever it is desired to change the water supply. Whenever such a change is desired, the can may be turned on its side and the water will drain out. Then the can may be dipped into water and a fresh supply will be admitted without the necessity of opening the can.

This can is provided with a hook 10 which has a ring 9 to which a line or chain 15 can be attached for lowering the can into water. The hook is so shaped as to let a belt go into it, and yet it is easily removed from the belt.

The lower end portion or section 11 of the hook is bent inwardly forming an offset portion at 11a to pass around the hinge and is secured to the can by rivets, or otherwise. These rivets are shown at 12. At the lower end portion 11 of the hook 10 there is formed a ring 13 which will receive a line or chain 16 to help in tipping the can over when it is desired to fill the same with fresh water. Reenforcing ribs 14 are formed around the top and bottom of the can.

A line 15 may be connected to the ring 9 whereby to lower the can into water when it is desirable to supply the can with fresh water. A line or chain may be attached to the ring 13 and used to pour part of the water out of the can when it is desirable to do so.

It is of course understood that the specific description of structure set forth above may be departed from without departing from the spirit of this invention as disclosed in this specification and as defined by the appended claims.

Having now described my invention, I claim:

1. A bait can comprising a container section, a belt hook including an upper hook portion and a lower section fixed rigidly to the container section adjacent its upper end, said sections being integral, the upper section lying above the container section, a line-receiver at the upper end of said hook section, lying above the container section, and a second line-receiver connected to the lower end of said lower section.

2. A bait can comprising a container section having an upper end, a belt hook including a lower attaching section and an upper belt-receiving section rigidly interconnected and provided with a line-receiving ring, said upper belt-receiving section having a loop adapted to extend inwardly or outwardly for connection to a line thereto, and means for fixing the lower attaching section to the upper end of said container section so that the upper belt-receiving section lies substantially entirely above the upper end of said container section.

3. A bait can as defined by claim 2 in which said belt hook has an offset portion connecting said lower attaching section and said upper belt-receiving section, a cover for said container section, and a hinge connecting the cover with said container section, said hinge having one leaf fixed between said lower attaching section and said container section with the joint of said hinge lying over said offset portion.

4. A bait can as defined by claim 2 in which section has a belt-receiving hook, the lower end of the belt receiving section is reversely bent to engage a belt.

5. A bait can as defined by claim 2 having an offset portion between said lower attaching section and said upper belt-receiving section, a cover for said container section, and a hinge connecting the cover with said container section, said hinge having one leaf fixed between said lower attaching section and said container section with the joint of said hinge lying over said offset portion, and the fastening means affixing said leaf of the hinge and said attaching section to said container section.

6. A bait can comprising a container section, a belt hook including an upper hook portion and a lower section, said lower section being fixed rigidly to the container section, adjacent its upper end, said sections being integral, the upper section lying above the container section, an extension of the upper section extending downwardly and having at its lower end a reverse bend which contacts the upper hook portion to form with the upper hook portion, a belt-receiving opening, a line-receiver at the upper end of said hook section, lying above the container section, and a second line-receiver connected to the lower end of said lower section.

References Cited in the file of this patent

UNITED STATES PATENTS

| Number | Name | Date |
|---|---|---|
| 353,022 | Deland | Nov. 23, 1886 |
| 354,958 | Weightman | Dec. 28, 1886 |
| 553,456 | Ferris | Jan. 21, 1896 |
| 886,337 | Balken | May 5, 1908 |
| 2,272,569 | Luhmann | Feb. 10, 1942 |
| 2,548,201 | Cromley | Apr. 10, 1951 |
| 2,550,533 | Clark | Apr. 24, 1951 |